United States Patent [19]

Rathert et al.

[11] Patent Number: 4,681,500

[45] Date of Patent: Jul. 21, 1987

[54] DELIVERY UNIT FOR BOOKBINDING MACHINES

[75] Inventors: Horst Rathert, Minden; Gerhard Grannemann, Petershagen; Ulrich Erdboris, Rahden, all of Fed. Rep. of Germany

[73] Assignee: Kolbus GmbH & Co. KG, Fed. Rep. of Germany

[21] Appl. No.: 837,704

[22] Filed: Mar. 7, 1986

[30] Foreign Application Priority Data

Mar. 8, 1985 [DE] Fed. Rep. of Germany ....... 3508236

[51] Int. Cl.⁴ ......................... B42B 5/00; B65G 47/31

[52] U.S. Cl. ....................................................... 412/33

[58] Field of Search .................... 412/16, 33; 198/461, 198/578

[56] References Cited

U.S. PATENT DOCUMENTS 3,830,358 8/1974 Desantis ........................... 412/13 X

FOREIGN PATENT DOCUMENTS 2428620 1/1975 Fed. Rep. of Germany .

*Primary Examiner*—Paul A. Bell

*Attorney, Agent, or Firm*—Chilton, Alix & Van Kirk

[57] ABSTRACT

In a delivery unit for bookbinding machines, book blocks released by the transport grippers of an adhesive-binding apparatus are transported by a conveyor along a downward-inclined linear path segment which is followed immediately by a horizontal path segment. The conveyor comprises an endless chain drive, routed around reversing sprockets, which transport carrier plates are positioned on the chain at regular intervals. The carrier plates are comprised of individual plate links which are pivotally interconnected but which support each other so that they cannot sag in the loading direction. The leading side of each carrier plate is pivotally coupled to the chain drive, while its trailing side is coupled to the chain drive via a slide-guide.

20 Claims, 4 Drawing Figures

DELIVERY UNIT FOR BOOKBINDING MACHINES

BACKGROUND OF THE INVENTION (1) Field of the Invention

The present invention relates to conveying systems, particularly conveying systems wherein the direction of motion of the objects being moved undergoes at least a first change, and especially to multi-level conveyors for transferring book blocks between work stations where diverse operations are performed thereon. More specifically, this invention is directed to the movement of relatively fragile articles, for example multielement articles which have been joined by an adhesive which has had insufficient time to set, between work stations located at different levels in a manner which insures that the initially established positional relationship between the elements is not disturbed. Accordingly, the general objects of the present invention are to provide novel and improved apparatus and methods of such character.

(2) Description of the Prior Art

While not limited thereto in its utility, the present invention is particularly well-suited for use in the delivery of partially completed books, i.e., book blocks, between work stations of a bookbinding machine which implements an adhesive binding process. Delivery or transfer units for such machines are known wherein the work being processed, i.e., a book or book block, is fed to a conveyor belt, which is inclined downwardly in the direction of travel of the work, after being released by the transport grippers of an adhesive-binding apparatus. At the end of the downwardly inclined conveyor belt, the workpieces are fed, via a generally horizontally oriented conveyor belt, to apparatus which performs the next operation thereon. While being transported, the books or book blocks rest on their spines and are laterally supported by a guide channel. In the case where a cover is to be adhesively secured to the book block, the steps of folding the front and back portions against the block are performed with the aid of appropriate guide elements simultaneously with the delivery of the book blocks from the adhesive-binding apparatus to the succeeding work station.

In order for the bookbinding machine to operate at a speed which does not impose a severe economic penalty on the overall bookbinding process, the adhesive will not have had time to fully cure when the workpieces are transferred from the adhesive-binding apparatus to the delivery or transfer unit which receives the workpieces at a first level and discharges the workpieces at a second level. Accordingly, it is of critical importance that the workpieces be handled with extreme care in order to insure, for example, that the initially established registration between a cover and book block is not disturbed. The previously available delivery units have not been capable of operating at an acceptably fast rate while handling the workpieces with the requisite care. This has been particularly true during the transfer of book blocks from a downwardly inclined conveyor onto a succeeding horizontally oriented conveyor. To the contrary, impact between the leading edge of the book block and the horizontal conveyor at the time of transfer, with resultant "crushing", has been a common occurrence. The forgoing has been particularly true in the situation where comparatively thick blocks were being conveyed at high transport speeds. The above-mentioned crushing, occuring during the transfer of the book block from an inclined transport plane into a horizontal movement plane, leads to "tearing" of the adhesive coating, this being a particular problem in the case of blocks which have been bound with a cold adhesive. While the above-described crushing effect could be reduced by imparting a relatively shallow angle to the inclined conveyor, the net result would be a delivery unit which would occupy an unacceptably large amount of factory floor space.

In situations where the book-block has an "unfavorable" format, for example a block which is very wide in relation to its height, the product being transported has an inherent instability and thus an inclination to overturn, particularly when undergoing a change in direction of movement. Accordingly, in such cases it has been common practice to effect an undesirable, from an economic viewpoint, decrease in operational speed of the book binding machine.

In the use of prior-art delivery units for bookbinding machines, additional problems arise in the case where the book blocks being transferred are of the layered type, i.e., comprised of block portions, with a length equivalent to half-pages. The layers or block portions have a tendency to project, i.e., the spine is not planar, and thus the possibility of tearing of the adhesively coated spine is increased. Any such tearing may lead to the displacement of a pair of adjacent book-block portions relative to one another and thus leads to an unacceptable product.

SUMMARY OF THE INVENTION

The present invention overcomes the above-briefly discussed and other deficiencies and disadvantages of the prior art by providing a novel and improved method and apparatus for transferring relatively fragile workpieces between comparatively closely spaced work stations located at different vertical levels. In a preferred form, the invention is a delivery unit for bookbinding machines of the type which implement an adhesive-binding process. This delivery unit includes a conveyor which transports book blocks, after they have been released from an adhesive-binding apparatus, along a downwardly inclined linear path. During this downwardly inclined movement, the book blocks are oriented with their spines facing downwardly and are laterally supported. The conveyor of the present invention also includes a horizontal path segment, located at the end of the downwardly inclined path, and the constantly moving book blocks are smoothly and gently turned from the inclined path into the horizontal path.

In accordance with the preferred embodiment of the invention, the book blocks or other workpieces, after falling through a vertical distance which is minimized, will be positioned on carrying plates. The workpieces are thereafter guided, while resting continuously on the carrying plates, along a path lying in a downwardly inclined plane and into a horizontal plane. This horizontal plane is aligned with the support surface of a succeeding work station, the workpieces being transferred to this support surface. In the case of book blocks which are being guided out of an adhesive-binding apparatus, a conveyor in accordance with the present invention permits the areas near the spine of the block to be subjected to compression and thus enables a so-called "fold-pressing" operation to be performed on the block.

The conveyor of a preferred embodiment of the present invention is defined by an endless drive band, for example a chain, to which a series of carrying plates are connected at regular intervals. Each of the carrying plates is comprised of a plurality of plate segments or links which, while pivotally interconnected, are arranged so that they cannot sag in the loading direction. The leading end of each carrying plate is pivotally coupled to the drive band while the trailing end thereof is connected to the drive band via a slide-guide.

The principle object of the present invention is to provide a delivery unit, and particularly a conveyor for book blocks, which transfers workpieces between work stations located at different vertical levels gently at high cycle frequencies and while retaining a short overall length.

BRIEF DESCRIPTION OF THE DRAWING

The present invention may be better understood and its numerous objects and advantages will become apparent to those skilled in the art by reference to the accompanying drawing wherein like reference numerals refer to like elements in the several figures and in which.

DESCRIPTION OF THE DISCLOSED EMBODIMENT

Figure 1:
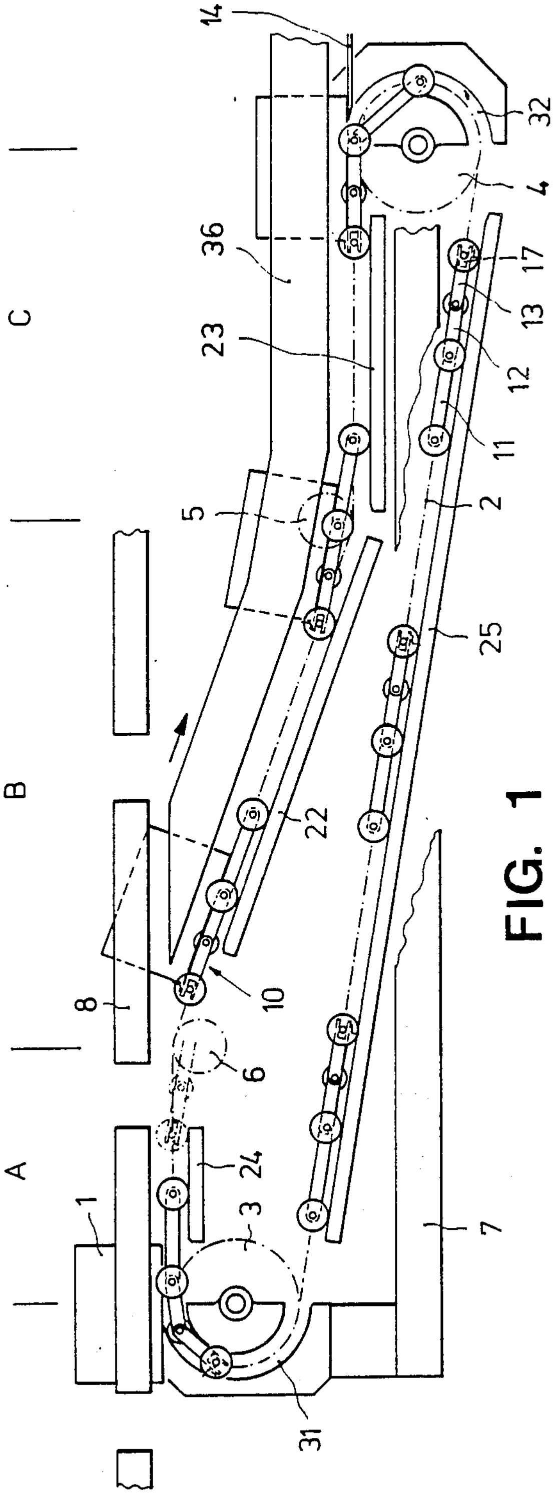
FIG. 1 is a schematic side-elevation view, partly broken away, of apparatus in accordance with a first embodiment of the present invention.
Figure 2:
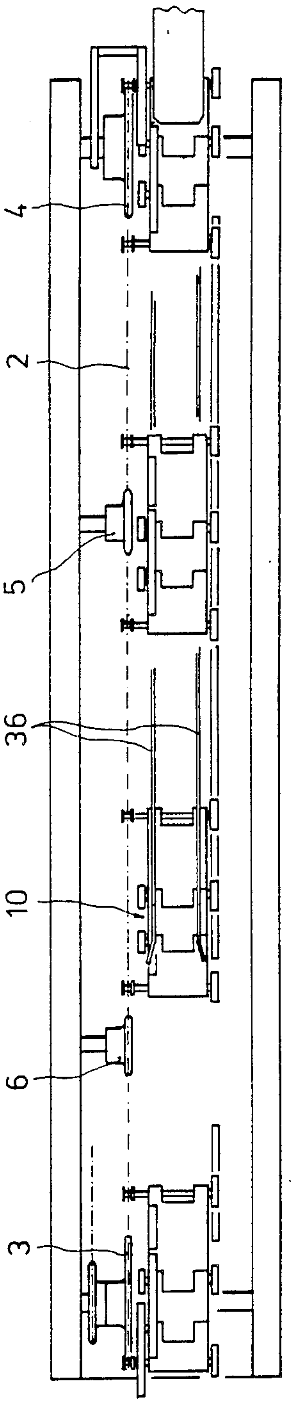
FIG. 2 is a top plan view of the apparatus of FIG. 1.

With reference now to the drawing, the present invention is shown in the environment of a delivery unit for a bookbinding machine which includes an adhesive-binding apparatus. This delivery unit comprises a conveyor defined by an endless roller chain 2. The chain 2 is routed around reversing sprocket-wheels 3, 4 and direction changing sprocket-wheels 5, 6. The sprocket wheels are mounted in a machine frame 7. The chain 2 is driven, in any suitable manner, such that it runs in sychronism with the block clamps, i.e., the transport grippers 8, of an adhesive-binding apparatus (not shown). Carrier plates, indicated generally at 10, are coupled to the chain 2 so as to be positioned at regular intervals. The carrying plates 10, each of which is provided with a trailing edge stop 10*a*, are comprised of three individual plate segments or links 11, 12 and 13. The plate links are pivotally interconnected in a hinge-like manner. As will be explained below, the plates 10 cannot sag in the loading direction. Accordingly, book blocks 1, which are to be acquired from the transport grippers 8 of the adhesive-binding apparatus, are presented with an even supporting surface throughout the entire time they are being moved under the influence of the delivery unit. Since the delivery unit of the present invention employs only a single drive chain 2, the carrier plates 10 are connected to the drive chain at only one side of the plates.

The disclosed delivery unit is intended for use in the transfer of workpieces, which are moving in a generally horizontal direction under the influence of the transport grippers 8, to a generally horizontally oriented support surface 14. As a result of the fact that the carrying plates 10 are comprised of individual plate links, the plates 10 require only a relatively small reversing radius. This small reversing radius insures trouble-free transfer of the book blocks or other work pieces to the downstream supporting surface 14 without the aid of any additional or intermediate mechanisms. In order to insure this trouble-free transfer, even when the book blocks being conveyed are small in height, the trailing plate links 13 of the carrier plates 10 are designed so as to have an overall length which is less than the minimum height of a book block to be conveyed.

Figure 3:
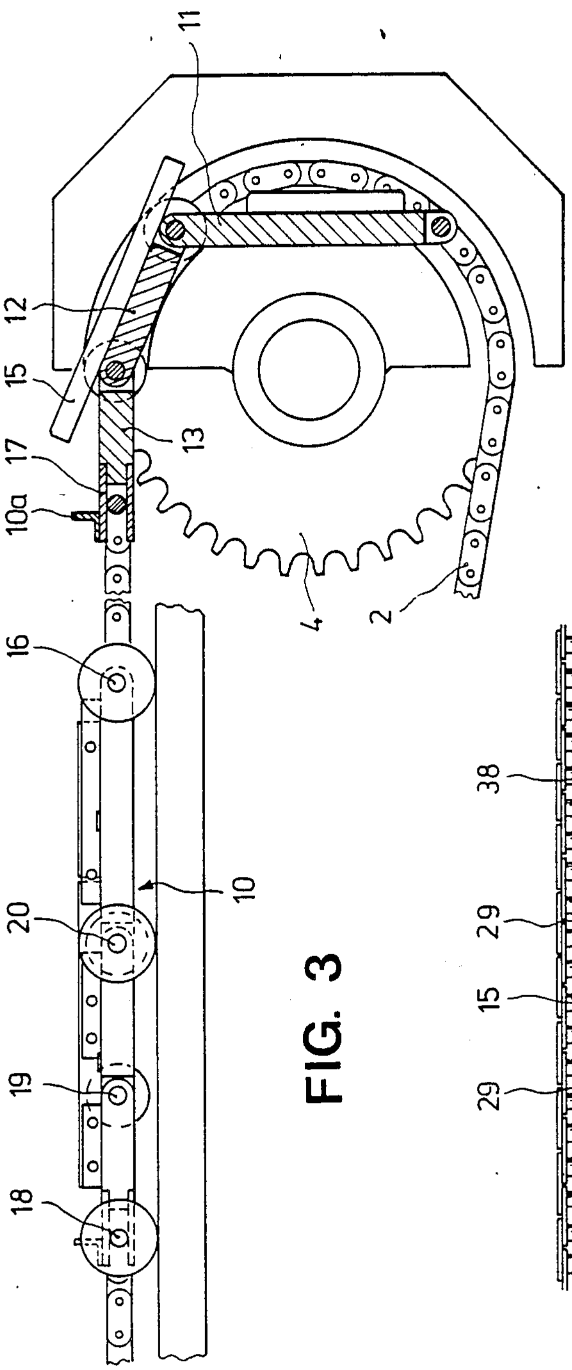
FIG. 3 is an enlarged partial side-elevation view, partly in section, of the terminal or downstream portion of the apparatus of FIGS. 1 and 2.
Figure 4:
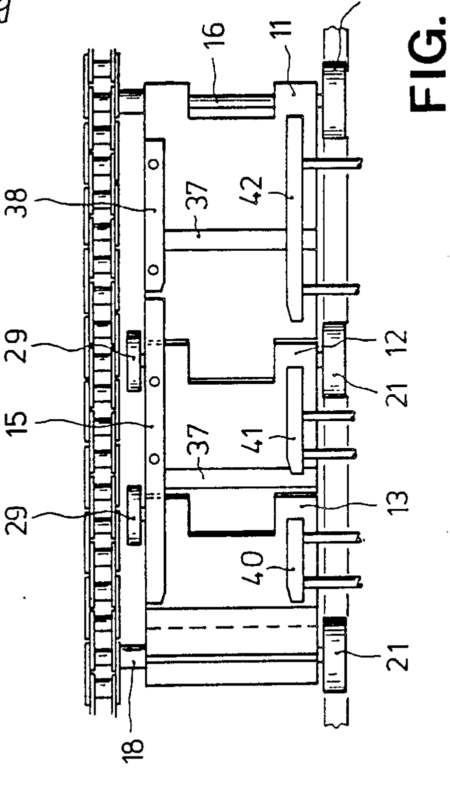
FIG. 4 is an enlarged top plan view of one of the carrying plates of the embodiment of FIGS. 1-3.

As noted above, the carrying plates 10 are constructed so that the individual plate links 11, 12, 13 will not deflect in the loading direction. This sag prevention is achieved through the use of a rail 15 which is connected to intermediate link 12. The rail 15, as may be best seen from FIG. 4, extends forwardly and rearwardly with respect to link 12 so as to overlap the links 11 and 13. Accordingly, while the carrying plate has a relatively small reversing radius, see FIG. 3, during the time it is conveying a book block or other workpiece, see FIG. 1, a lip on rail 15 will engage the upper surfaces of all of plate links 11, 12 and 13 and thus will prohibit counter clock-wise pivotal movement of plate link 11 relative to plate link 12 and clock-wise pivotal movement of plate 13 relative to plate 12.

The driving connection between chain 2 and the carrying plates 10 is established by means of an axle 16, at the leading edge of each carrying plate, which pivotally couples the plate link 11 to the chain. Also, the trailing plate link 13 engages, at its trailing end, a second axle 18 via a slide-guide 17 (see FIG. 3). The axle 18 is mounted on the chain 2 and the link 13 is within limits freely displaceable, in the longitudinal direction, with respect to axle 18. Accordingly, the use of the slide-guide 17 permits a limited degree of relative longitudinal motion between the chain and the carrying plate, i.e., enables length-compensation to occur, in the regions where the chain reverses or changes direction.

As noted above, the individual plate links 11, 12 and 13 are pivotally interconnected in a hinge-like manner. The pivotal innerconnection between plate links 11 and 12 is accomplished by means of an axle 20 while the innerconnection between plates 12 and 13 is accomplished means of an axle 19. Idler rollers 21 are provided on the free ends of the axles 16 and 18 and on the end of axle 20 which is located at the same side of the carrier plate as the said free ends of axles 16 and 18. The idler rollers 21 are supported, during the circulating movement of the carrying plates, on track segments 22, 23, 24 and 25. The track segments 22, 23 and 24 are assigned to the upper chain run. A free space is defined between track segments 24 and 22 in the region where the conveying direction changes from the horizontal path segment A to the downwardly-inclined path segment B. This free space eliminates the need for deflection of the platform defined by the plate links 11, 12 and 13 as the direction of movement thereof changes from horizontal to inclined. A further free space, for the same purpose, is provided between track segments 22 and 23. The track segment 25 is assigned to the lower chain run.

In order to guide the carrying plates 10 in the regions where the roller chain 2 reverses direction, steering rollers 29 are provided on the ends of axles 19 and 20 which are located adjacent the chain 2. The steering rollers 29 run on curved terminal tracks 31 and 32, see FIG. 1, which belong to the delivery unit and follow the reversing radii.

In order to insure that the workpieces, i.e., the book blocks 1, fall through the shortest possible vertical distance when being released by the transport grippers 8 onto the carrying plates 10, the roller chain 2 is positioned so as to cause the carrying plates to closely approach the grippers 8 and to move parallel thereto, i.e., in a horizontal direction, over a defined path segment A. Accordingly, as a result of the ability to establish parallel movement between the grippers and carrying plates at the time the workpieces are released by the grippers, the drop can be made minimal and will occur before the books begin their movement down the inclinded path segment B. Obviously, immediately after release of the workpieces, they will remain laterally supported by the transport grippers 8 and thus will not be unsupported at any time prior to engagement by guides 36 which will be discussed below.

As noted above, the carrying plates 10 are configured such that they will not sag or deflect when in the loaded state, i.e., while supporting a workpiece. Accordingly, book blocks or other workpieces released onto the carrying plates by the transport grippers 8 are guided downwardly and, subsequently, redirected into a horizontal plane in order to be fed to the downstream work station. During movement, the spines of book blocks will rest continuously on the carrying plates 10 and will bear against the trailing edge stops 10*a* thereof. Also, as shall be described below, the book blocks move within an extremely confined space and are treated with the utmost gentleness. Thus, the book blocks 1 are held in their vertical attitude by means of the above-mentioned guides 36. The guides 36 will typically be comprised of sheet metal and will be installed at the sides of the path of movement defined by the chain 2 and carrier plates 10. If necessary or desirable, the guides 36 can be configured at their entry end as erecting elements, of a type known in the art, which are twisted through an angle of 90°. Such combination erecting elements/guides will be used when processing book blocks with covers which have been attached to the spines by means of an adhesive, the erecting elements serving to erect the front and back cover portions and urge them against the book blocks while the books are being guided out of the adhesive-binding apparatus.

In the interest of preventing the book blocks 1 or other workpieces from moving on the carrying plates 10, coatings 37 of a non-slip material may be provided on the plates. Additionally, or alternatively, stationary stops may be provided. Thus, in the disclosed embodiment the rail 15 may function as a first stationary stop while a second stop is defined by a rail 38 which is affixed to the leading plate link 11. The stationary stops cooperate with pressure rails 40, 41 and 42 which are positioned at the opposite side of the path of movement relative to the stationary stops. The pressure rails may be moved in a direction transverse to the direction of motion of the workpieces such that they can be retracted in order to receive a book block or other workpiece and, subsequently, may be moved inwardly until they contact the workpiece. It is also possible, in the interest of performing a "fold-pressing" operation on a moving book block, to provide means for exerting a substantially increased pressure on the block in a region near the spine.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. Conveyor apparatus for transferring moving workpieces from a first level to a second level which is vertically displaced from the level, said conveyor apparatus comprising:

drive means, said drive means including a continuous band which passes over fixed position rotatable members which change the direction of said band, said band and rotating members defining plural linear path segments, a pair of said path segments being respectively commensurate with said first and second levels, a third of said path segments being intermediate the path segments of said pair and being inclined; and a plurality of spatially displaced carrier plate defining means coupled to said band from movement therewith while supporting workpieces, said plate defining means each including:

a plurality of plate segments;

means pivotally interconnecting said plate segments; in series;

means engaging said interconnected plate segments to prevent load induced deflection thereof during movement along said linear path segments whereby said plate segments form a substantially flat support surface for a workpiece;

means pivotally connecting a first of said plate segments to said band, said first plate segment being the leading plate segment in the direction of travel of said carrier plate defining means; and means connecting a second of said plate segments to said band, said second plate segment being the trailing plate segment in the direction of travel of said carrier plate defining means, said second plate segment connecting means permitting relative longitudinal movement between at least said second plate segment and said band.

2. The apparatus of claim 1 wherein said conveyor apparatus is a delivery unit for a bookbinding machine which implements an adhesive-binding process, the bookbinding machine including clamping means for transporting individual workpieces along a path with the workpieces being generally aligned with and above the said of said linear path segments, the workpieces being released from said clamping means onto said carrier plate defining means when said plate defining means is traveling along said first of said linear path segments, said first path segment being generally parallel to the path of transporting defined by said clamping means, said band being driven at a speed sufficient to cause said carrier plate defining means to move in synchronism with the clamping means of the bookbinding machine.

3. In a bookbinding machine, the machine having a first work station at a first vertical level, an adhesive being applied to a partly completed book at said first work station, and a second downstream work station located at a second vertical level which differs from the said first level, an improved delivery unit for conveying the partially completed books supported on their spines from the first work station to the second work station, said improved delivery unit including:

drive means, said drive means comprising an endless drive chain and means for changing the direction of said chain, said direction changing means being stationary and positioned such that said chain defines at least a substantially linear inclined path segment followed by a substantially horizontal linear path segment, the substantially horizontal path segment being at a level which is commensurate with the level of said second work station;

a plurality of carrier plate means for supporting partially completed books, said carrier plate means each being comprised of a plurality of individual plate segments, said plate segments being pivotally interconnected in series;

means for pivotally connecting a first of said plate segments of each of said plate means to said drive chain whereby motion of said chain is imparted to said carrier plate means, said first plate segment being the leading segment in the direction of travel of the carrier plate means;

means cooperating with said interconnected plate segments of each of said plate means for preventing load induced deflection thereof when said plate means are moved along and between said linear path segments whereby said plate segments form a substantially flat support surface for a partially completed book; and means for coupling a second of said plate segments of each of said plate means to said drive chain, said second plate segment being the trailing plate segment in the direction of travel of the carrier plate means, said coupling means permitting limited relative longitudinal movement between at least said second plate segments and said chain.

4. The apparatus of claim 3 further comprising:

means for exerting a force in a direction transverse to the direction of motion of a partially completed book being conveyed on a said carrier plate defining means.

5. The apparatus of claim 4 wherein said force transmitting means includes movable clamp means and stationary backing rail means, said backing rail means being affixed to said carrying plate means.

6. The apparatus of claim 3 further comprising:

stationary guide plate means, said stationary guide plate means being mounted at either side of the path of motion of a partially completed book being conveyed on said carrier plate means and engaging said partially completed book to provide lateral support thereto.

7. The apparatus of claim 3 wherein said direction changing means further define a substantially horizontal path segment upstream of said inclined path segment, the level of said upstream generally horizontal path segment being commensurate with said first level.

8. The apparatus of claim 7 wherein said carrying plate means are each connected to said drive chain at one side thereof and wherein said apparatus further comprises:

idler roller means, said idler roller means each including an idler roll positioned at the side of said carrier plate disposed oppositely with respect to said drive chain, said idler rolls in part supporting said plate segments; and guide track means for said idler rolls, said guide track means including a plurality of tracks segments, three of said track segments being commensurate with the chain run when the delivery unit is supporting a partially completed book, said three track segments defining a track which is discontinuous in the region where the direction of carrier plate means motion changes from horizontal to inclined and from inclined to horizontal.

9. The apparatus of claim 7 wherein said carrier plate means each comprise three plate segments, a third plate segment being positioned intermediate said first and second plate segments and wherein said apparatus further comprises:

steering rollers mounted on at least said second and third plate segments of each of said plate means; and means defining guide tracks which are engaged by said steering rollers, said guide track defining means respectively cooperating with a pair of said direction changing means which reverse the direction of said drive chain.

10. The apparatus of claim 9 wherein said carrying plate means are each connected to said drive chain at one side thereof and wherein said apparatus further comprises:

idler roller means, said idler roller means each including an idler roll positioned at the side of said carrier plate disposed oppositely with respect to said drive chain, said idler rolls in part supporting said plate segments; and guide track means for said idler rolls, said guide track means including a plurality of tracks segments, three of said track segments being commensurate with the chain run when the delivery unit is supporting a partially completed book, said three track segments defining a track which is discontinuous in the region where the direction of carrier plate means motion changes from horizontal to inclined and from inclined to horizontal.

11. The apparatus of claim 10 wherein said guide track means includes a further track segment which engages said idler rolls in the region intermediate said steering roller engaging guide track defining means.

12. The apparatus of claim 9 wherein the length of said second plate segments is less than the minimum height of a partially completed book to be conveyed.

13. The apparatus of claim 12 wherein said means for preventing load induced deflection of each of said carrier plate means comprises:

a rail mounted on said third plate segment, said rail engaging surface portions of said first and second plate segments.

14. The apparatus of claim 9 wherein said means for preventing load induced deflection of each of said carrier plate means comprises:

a rail mounted on said third plate segment, said rail engaging surface portions of said first and second plate segments.

15. The apparatus of claim 3 wherein said carrier plate means each comprise three plate segments, a third plate segment being positioned intermediate said first and second plate segments and wherein said apparatus further comprises:

steering rollers mounted on at least said second and third plate segments of each of said plate means; and means defining guide tracks which are engaged by said steering rollers, said guide track defining means respectively cooperating with a pair of said direction changing means which reverse the direction of said drive chain.

16. The apparatus of claim 15 wherein the length of said second plate segments is less than the minimum height of a partially completed book to be conveyed.

17. The apparatus of claim 16 wherein said means for preventing load induced deflection of each of said carrier plate means comprises:

a rail mounted on said third plate segment, said rail engaging surface portions of said first and second plate segments.

18. The apparatus of claim 15 wherein said means for preventing load induced deflection of each of said carrier plate means comprises:

a rail mounted on said third plate segment, said rail engaging surface portions of said first and second plate segments.

19. The apparatus of claim 3 wherein said carrying plate means each further comprise:

a trailing-edge stop extending from said second plate segment to engage a partially completed book being conveyed by the carying plate means.

20. The apparatus of claim 3 wherein said carrying plate means each further comprise:

means on said support surface thereof for impeding relative sliding motion between said carrying plate means support surface and a said partially completed book.

* * * * *

UNITED STATES PATENT AND TRADEMARK OFFICE
CERTIFICATE OF CORRECTION

PATENT NO. : 4,681,500

DATED : July 21, 1987

INVENTOR(S) : Horst Rathert et al

It is certified that error appears in the above-identified patent and that said Letters Patent is hereby corrected as shown below:

Column 6, line 6 (claim 1, line 3), before "level", insert -- first --.

Signed and Sealed this

Tenth Day of May, 1988

*Attest:*

DONALD J. QUIGG

*Attesting Officer*

*Commissioner of Patents and Trademarks*